US012802582B2

(12) United States Patent
Huang

(10) Patent No.: US 12,802,582 B2
(45) Date of Patent: Nov. 17, 2026

(54) APPARATUS FOR IMPLEMENTING IN-PERSON TEACHING AND ONLINE TEACHING

(71) Applicant: HybriU Inc., Dover, DE (US)

(72) Inventor: Jin Huang, Lynnwood, WA (US)

(73) Assignee: HybriU Inc., Dover, DE (US)

( * ) Notice: Subject to any disclaimer, the term of this patent is extended or adjusted under 35 U.S.C. 154(b) by 118 days.

(21) Appl. No.: 18/794,936

(22) Filed: Aug. 5, 2024

(65) Prior Publication Data

US 2025/0225886 A1 Jul. 10, 2025

(30) Foreign Application Priority Data

Jan. 9, 2024 (CN) ......................... 202420055898.1

(51) Int. Cl.
*G09B 5/06* (2006.01)
*G06F 3/14* (2006.01)
*G09B 5/14* (2006.01)

(52) U.S. Cl.
CPC ........... *G09B 5/065* (2013.01); *G06F 3/1454* (2013.01); *G09B 5/14* (2013.01)

(58) Field of Classification Search
CPC .............................. G09B 5/065; G06F 3/1454
See application file for complete search history.

(56) References Cited

U.S. PATENT DOCUMENTS 8,769,172 B2 * 7/2014 Soffer ................... G06F 13/105 710/64
11,412,180 B1 * 8/2022 Mayfield ................ H04N 7/147
12,401,756 B2 * 8/2025 Bryan ........................ G06T 7/11
2010/0099367 A1 * 4/2010 Shamim .............. H10F 39/1892 455/95
2010/0169790 A1 * 7/2010 Vaughan ........... H04M 1/72415 715/740
2012/0147192 A1 * 6/2012 Wright ............... H04N 21/4334 348/E7.085
2013/0288615 A1 * 10/2013 Anand ..................... H01Q 3/04 455/77
2013/0314421 A1 * 11/2013 Kim ........................ G06T 19/00 345/427
2015/0138304 A1 * 5/2015 Mcardell .................. H04N 7/15 348/14.07

(Continued)

*Primary Examiner* — Olisa Anwah
(74) *Attorney, Agent, or Firm* — PROCOPIO, CORY, HARGREAVES & SAVITCH LLP

(57) ABSTRACT

The present application provides an apparatus for implementing in-person teaching and online teaching. The apparatus comprises: a multimedia module configured to collect a first multimedia signal both on-site and from remote in real time; a WIFI module and an antenna interface, configured to connect to a wireless controller for receiving an operation instruction transmitted from the wireless controller and sending the operation instruction to the processing control module; a processing control module configured to process the first multimedia signal to obtain a second multimedia signal, and send the processed second multimedia signal to the multimedia module; wherein the multimedia module comprises a multimedia output interface, configured to connect to and transmit the second multimedia signal to a multimedia display device arranged locally and/or remotely for display.

19 Claims, 3 Drawing Sheets

(56) References Cited

U.S. PATENT DOCUMENTS

| | | | | |
|---|---|---|---|---|
| 2016/0117339 | A1* | 4/2016 | Raskin | G06F 16/4387 434/319 |
| 2016/0373693 | A1* | 12/2016 | Segal | H04N 21/47 |
| 2019/0313050 | A1* | 10/2019 | Wang | H04N 5/58 |
| 2022/0158814 | A1* | 5/2022 | Yu | H04L 5/1461 |
| 2024/0388776 | A1* | 11/2024 | Xiang | H04N 9/3141 |

* cited by examiner

APPARATUS FOR IMPLEMENTING IN-PERSON TEACHING AND ONLINE TEACHING

CROSS-REFERENCE TO RELATED APPLICATIONS

This application claims priority from CN 2024200558981, filed Jan. 9, 2024. The entire content of the priority application is incorporated herein by reference.

FIELD OF THE INVENTION

The present application relates to the field of communication technology, and more particularly, to an apparatus for implementing in-person teaching and online teaching.

BACKGROUND OF THE INVENTION

With the rapid development of communication technology, online teaching burgeons in the field of education in addition to the traditional form of teachers teaching students face to face in classrooms. That is, teachers give lessons by live streaming, or record teaching videos for students to learn and watch online, or give lessons by live streaming which will be recorded. Teaching in these ways is not easily affected by time, space or environment, and allows a more flexible number of learning students. However, due to a large number of participants, this kind of teaching requires the setup of a corresponding plurality of network servers and supporting hardware devices, which is relatively complicated and limited by the environment of application. Especially for an instructor, such complicated operation brings many inconveniences. Hence, there is a need for a highly integrated apparatus for in-person and online teaching without excessive operation of the instructor.

DESCRIPTION OF THE UTILITY MODEL

The present application is made in view of at least one of the above-mentioned technical problems existing in the prior art. In a first aspect of the present application, there is provided an apparatus for implementing in-person teaching and online teaching, characterized in that the apparatus is integrally provided with a multimedia module, a processing control module, and a WIFI module and an antenna interface, wherein:

The multimedia module is configured to collect a first multimedia signal both on-site and from remote in real time and transmit the first multimedia signal to the processing control module, wherein the first multimedia signal both on-site and from remote at least comprises an instructor's courseware video signal, an instructor's lecturing image/video signal, an instructor's audio signal and an image/video signal of on-site students;

The WIFI module and the antenna interface are configured to connect to a wireless controller for receiving an operation instruction transmitted from the wireless controller and sending the operation instruction to the processing control module;

The processing control module is configured to receive and process the first multimedia signal to obtain a second multimedia signal, and send the processed second multimedia signal to the multimedia module; and The multimedia module further comprises at least one set of multimedia output interfaces, configured to connect to, and transmit the processed second multimedia signal received from the processing control module to, a multimedia display device arranged locally and/or remotely for display.

In some embodiments, the multimedia module comprises one set of multimedia input interfaces for inputting a local instructor's courseware video signal.

In some embodiments, the multimedia module comprises one set of network input interfaces configured to connect to a cloud server for uploading a recorded courseware to the cloud server for storage.

In some embodiments, the multimedia module comprises at least two sets of webcam interfaces for acquiring an instructor's lecturing image/video signal and an image/video signal of on-site students, respectively captured by local webcams.

In some embodiments, the multimedia module comprises two sets of multimedia output interfaces; wherein one set of multimedia output interfaces is configured to connect to a head-up display arranged locally, and the other set of multimedia output interfaces is configured to connect to a big screen arranged locally.

In some embodiments, the multimedia module further comprises an audio receiving module configured to receive and store an instructor's audio signal.

In some embodiments, the multimedia module further comprises an audio output module configured to output system and remote audio signals.

In some embodiments, the apparatus further comprises an expansion module configured to connect to at least one of a USB splitter, a wired keyboard & mouse, a wireless keyboard & mouse, a laser pointer with remote control, an audio processor, a sound console, a sound card, and an audio mixer.

In some embodiments, the apparatus further comprises a multi-function interface module that supports at least one of the following protocols: a RS485 protocol, a CAN communication protocol, a UART protocol and a GPIO communication protocol.

In the embodiments of the present application, a first multimedia signal is processed by a processing control module to generate a second multimedia signal and send the processed second multimedia signal to a near-end and/or far-end display device, so that the in-person teaching and online teaching can be realized only with one apparatus for implementing in-person teaching and online teaching, which is of a high degree of overall integration. The apparatus of the embodiment of the present application can replace the multimedia devices used in the existing classrooms, and realize in-person teaching and online teaching without excessive operation of an instructor, but simply connecting to the instructor's computer or logging into the instructor's account to share his/her courseware.

BRIEF DESCRIPTION OF THE DRAWINGS

In order to more clearly explain the technical schemes in the embodiments of the present application, the following will briefly introduce the drawings needed in the description of the embodiments. Obviously, the drawings in the following description are only some embodiments of the present application. Those of ordinary skill in the art can also obtain other drawings based on these drawings without any creative effort.

Figure 1:
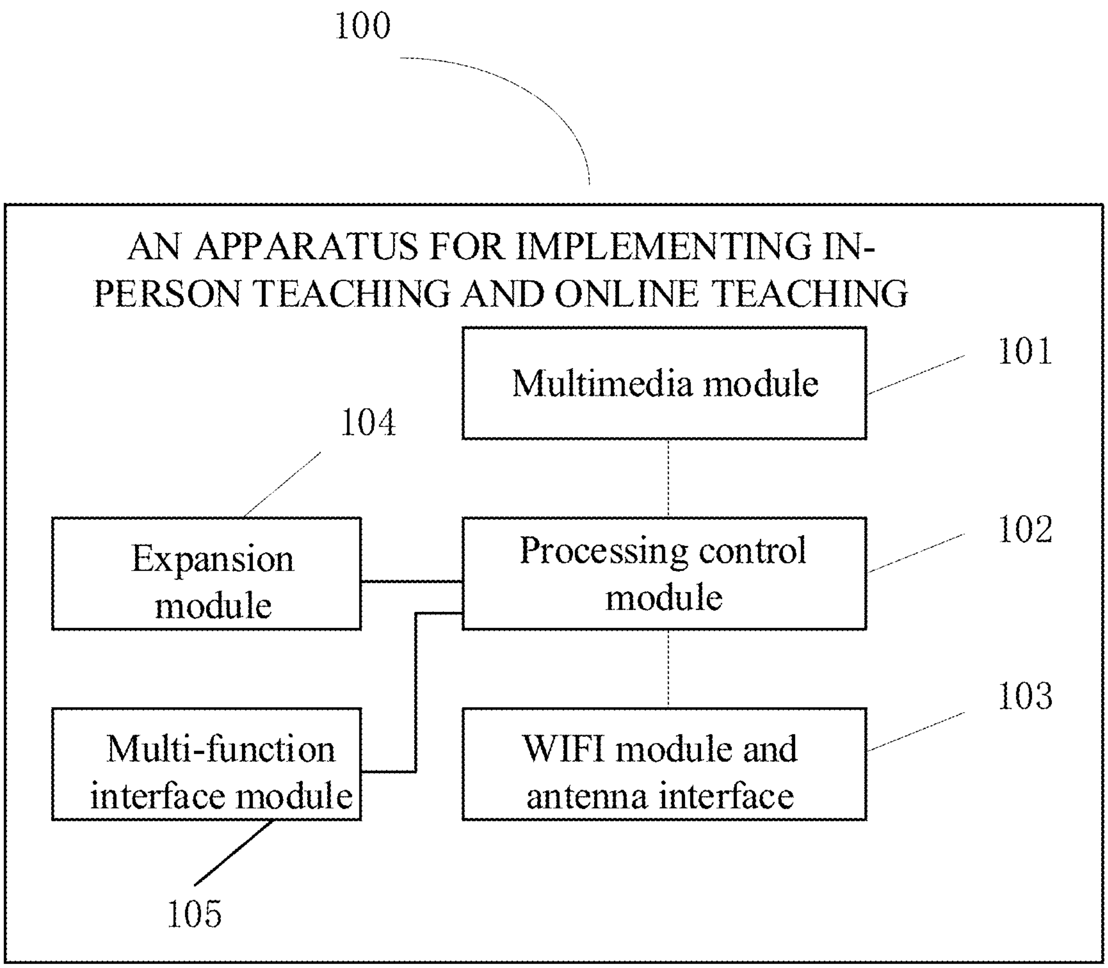
FIG. 1 illustrates a schematic block diagram of an apparatus for implementing in-person teaching and online teaching according to an embodiment of the present application.

Reference Numerals: 100. Apparatus for implementing in-person teaching and online teaching; 101. Multimedia module; 1011. First HDMI; 1012. Second HDMI; 1013. Third HDMI; 1014. Fourth HDMI; 1015. RJ45 switch module; 1016. Audio receiving module; 1017. Audio output module; 102. Processing control module; 103. WIFI module and antenna interface; 104. Expansion module; 105. Multi-function interface module.

DETAILED DESCRIPTION OF THE PREFERRED EMBODIMENTS

In order to enable those skilled in the art to better understand the technical schemes of the embodiments of the present application, the following will clearly and completely describe the technical schemes in the embodiments of the present application with reference to the accompanying drawings in the embodiments of the present application. Obviously, the described embodiments are only a part of the embodiments of the present application, rather than all the embodiments. Based on the embodiments in the present application, all the other embodiments obtained by persons of ordinary skill in the art without making creative efforts fall within the scope of the present application.

Based on at least one of the above technical problems, the present application provides an apparatus for implementing in-person teaching and online teaching, characterized in that the apparatus is integrally provided with a multimedia module, a processing control module, and a WIFI module and an antenna interface, wherein: the multimedia module is configured to collect a first multimedia signal both on-site and from remote in real time and transmit the first multimedia signal to the processing control module, wherein the first multimedia signal both on-site and from remote at least comprises an instructor's courseware video signal, an instructor's lecturing image/video signal, an instructor's audio signal and an image/video signal of on-site students; the WIFI module and the antenna interface are configured to connect to a wireless controller for receiving an operation instruction transmitted from the wireless controller and sending the operation instruction to the processing control module; the processing control module is configured to receive and process the first multimedia signal to obtain a second multimedia signal, and send the processed second multimedia signal to the multimedia module; and the multimedia module further comprises at least one set of multimedia output interfaces, configured to connect to, and transmit the processed second multimedia signal received from the processing control module to, a multimedia display device arranged locally and/or remotely for display. In the embodiments of the present application, a first multimedia signal is processed by a processing control module to generate a second multimedia signal and send the processed second multimedia signal to a near-end and/or far-end display device, so that the in-person teaching and online teaching can be realized only with one apparatus for implementing in-person teaching and online teaching, which is of a high degree of overall integration. The apparatus of the embodiment of the present application can replace the multimedia devices used in the existing classrooms, without excessive operation of an instructor, but simply connecting to the instructor's computer or logging into the instructor's account to share his/her courseware.

FIG. 1 illustrates a schematic block diagram of an apparatus 100 for implementing in-person teaching and online teaching according to an embodiment of the present application. As shown in FIG. 1, the apparatus 100 for implementing in-person teaching and online teaching according to an embodiment of the present application may comprise a multimedia module 101, a processing control module 102 and a WIFI module and an antenna interface 103.

Wherein, the multimedia module 101 is configured to collect a first multimedia signal both on-site and from remote in real time and transmit the first multimedia signal to the processing control module 102, wherein the first multimedia signal both on-site and from remote at least comprises an instructor's courseware video signal, an instructor's lecturing image/video signal, an instructor's audio signal and an image/video signal of on-site students.

The multimedia module, comprising one set of multimedia input interfaces, is configured to input a local instructor's courseware video signal.

Figure 2:
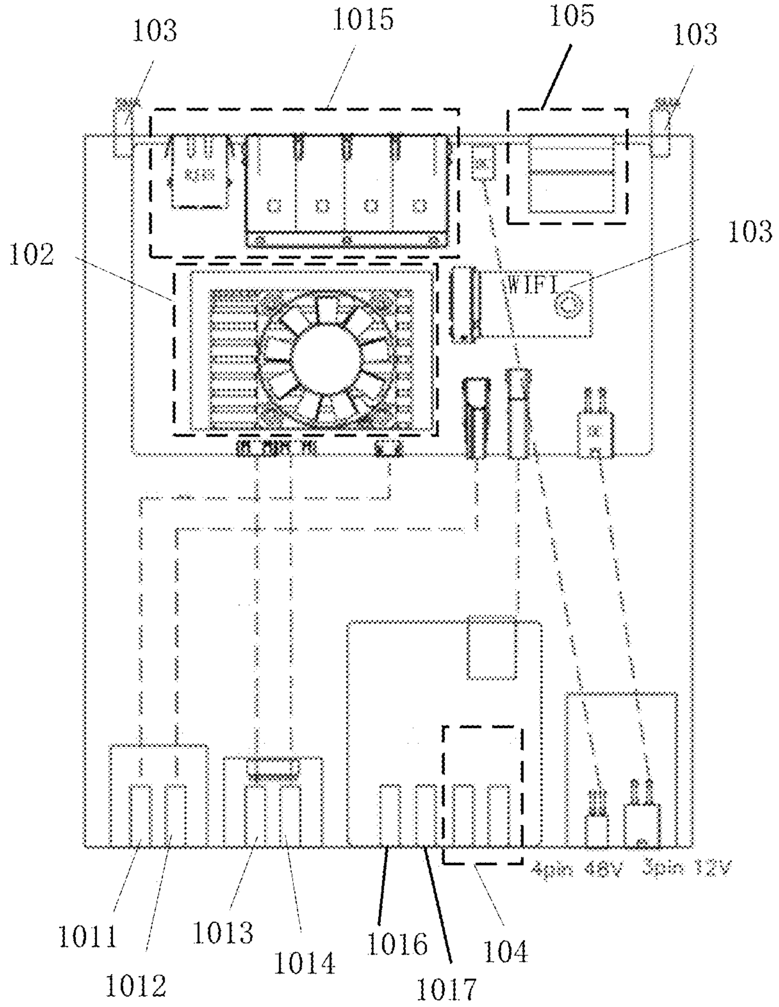
FIG. 2 illustrates a schematic diagram of an apparatus for implementing in-person teaching and online teaching according to an embodiment of the present application.

Continuing with FIG. 2, the multimedia module 101 may further comprise a third HDMI 1013 and a fourth HDMI 1014. Wherein, the third HDMI is an unidirectional HDMI input interface, and the fourth HDMI is an unidirectional HDMI input interface.

For example, the third HDMI 1013 and the fourth HDMI 1014 can be used to access data collected by a local terminal such as a laptop computer, a desktop computer, a camera and other video and audio device of a teacher, which, after being processed by the processing control module 102, is sent to the first HDMI 1011, the second HDMI 1012, etc. so as to be sent to an on-site multimedia display device and/or a remote display device for display.

In one example, the multimedia module 101 comprises one set of network input interfaces configured to connect to a cloud server for uploading a live streaming/recorded courseware to the cloud server for storage. In conjunction with FIG. 2, the multimedia module 101 further comprises an RJ45 switch module 1015 configured to access an Ethernet device; wherein the RJ45 switch module 1015 comprises at least two RJ45 interfaces. The RJ45 switch module 1015 in the embodiment of the present application is a kind of information socket (communication outlet) connector in the wiring system, wherein the connector consists of a plug (connector, crystal head) and a socket (module), and the plug has 8 grooves and 8 contacts.

The RJ45 switch module 1015 of the embodiment of the present application supports Power Over Ethernet (POE), and can access an Ethernet device, such as a webcam, a POE camera, a switch, and the like via the RJ45 switch module 1015. The RJ45 switch module 1015 may also be used for local area network (LAN) isolation, isolated from the network of RJ45 to facilitate device management.

In another example of the present application, the cloud server may also be requested to retrieve a pre-stored recorded video file and then send the recorded video file to an on-site multimedia display device and/or a remote display device, for display.

In yet another example, the multimedia module 101 comprises at least two sets of webcam interfaces for acquiring an instructor's lecturing image/video signal and an image/video signal of on-site students, respectively captured by local webcams. The RJ45 switch module 1015 of the embodiment of the present application can be used as an unidirectional input interface and is provided with 2 POE cameras to collect video data. In a further example, four POE cameras may be provided, wherein two POE cameras are used to collect video data, and the other two POE cameras are reserved for expansion according to different usage scenarios.

In another further example, the multimedia module 101 comprises two sets of multimedia output interfaces; wherein one set of multimedia output interfaces is configured to connect to a head-up display arranged locally, and the other set of multimedia output interfaces is configured to connect to a big screen arranged locally.

In conjunction with FIG. 2, the multimedia module 101 comprises at least two multimedia output interfaces, i.e. the first HDMI 1011 and the second HDMI 1012 in FIG. 2. Wherein, the first HDMI 1011 is an unidirectional HDMI output interface, and the second HDMI 1012 is an unidirectional HDMI output interface.

For example, the first HDMI 1011 connects to a big screen, projector or the like, and the second HDMI 1012 connects to a head-up display.

In an embodiment of the present application, the multimedia module further comprises an audio receiving module 1016 configured to receive and store an instructor's audio signal. For example, the audio receiving module includes a USB interface and connects to a microphone via the USB interface to collect the audio signal of an instructor.

In another embodiment of the present application, the multimedia module further comprises an audio output module 1017 configured to output system and remote audio signals. For example, the audio output module includes a USB interface and connects to a speaker via the USB interface to play the system and remote audio signals on site.

In one embodiment of the present application, the first multimedia signal to be collected both on-site and from remote can be collected through devices such as desktop computer, laptop computer, video camera, webcam, and wireless co-screener. For example, these devices are connected to the HDMIs of the apparatus, to transmit the first multimedia signal collected both on-site and from remote to the apparatus.

In a smart classroom application scenario, the multimedia capture device may be a camera and a laptop computer, wherein the camera captures the video image and the audio signal of a teacher, and the laptop computer captures the video signal of a shared file displayed on a desktop of the laptop computer. The camera is connected to the multimedia module via the first HDMI 1011, and the laptop computer is connected to the multimedia module via the second HDMI 1012, thereby forming two first multimedia signals.

Wherein, the processing control module 102 is configured to receive and process the first multimedia signals to obtain second multimedia signals, and send the processed second multimedia signals to the multimedia module 101.

In another embodiment of the present application, the multimedia module further comprises at least one set of multimedia output interfaces configured to connect to, and transmit the processed second multimedia signal received from the processing control module to, a multimedia display device arranged locally and/or remotely for display.

For example, the multimedia module 101 collects three multimedia signals altogether, the first multimedia signal is a video signal collected by a webcam; the second multimedia signal is a video signal collected by an HDMI interface (for example, a laptop computer is connected by an HDMI to obtain a file displayed thereon); and the third multimedia signal is an audio signal collected by a microphone. Wherein, two video signals can be output to the home screen as the video signal of the home screen, or output to the head-up display as the video signal of the head-up display, or output to the remote display device; while the audio signal is played through the speaker.

In embodiments of the present application, it is also possible to collect through a webcam, and display on a local display terminal (such as a home screen), the image of a remote student.

In a smart classroom application scenario, the multimedia capture device may be a webcam and a laptop computer, where the webcam is connected to the multimedia module via the first HDMI 1011, and the laptop computer is connected to the multimedia module via the second HDMI 1012. The webcam captures the video image on a laptop computer of a teacher, or the laptop computer captures the signal of a shared file displayed on the desktop of the laptop computer, thereby forming two first multimedia signals, which are the original multimedia signals collected by the multimedia capture device and cannot be directly displayed on the display device. The processing control module 102 processes the two first multimedia signals to form two second multimedia signals, which would be multimedia signals that can be directly displayed on a display device. For example, the processing control module 102 carries out synchronous processing of video signal and audio signal; for another example, the processing control module 102 performs format conversion processing on the first multimedia signal, and the like.

The processing control module 102 of the embodiment of the present application may comprise a central processing unit (CPU), a graphic processing unit (GPU), an application-specific integrated circuit (ASIC), a field-programmable gate array (FPGA) or other forms of processing units with data processing capabilities and/or instruction execution capabilities, and may be other component in the apparatus 100 for implementing in-person teaching and online teaching to perform the desired functions.

Continuing with FIG. 2, in an embodiment of the present application, the WIFI module and the antenna interface 103 are configured to connect to a wireless controller for receiving a setting instruction, an acquisition instruction, an output instruction, a transmission instruction, or an operation instruction sent by the wireless controller and sending the said instruction to the processing control module, for processing. Wherein, the model of the antenna interface is Sub Miniature Version A (SMA); and the WIFI module and the antenna interface can also be used for connecting an external input device.

The SMA antenna interface is a miniaturized interface standard and adopts a threaded connection design to provide reliable connectivity and high-frequency bandwidth transmission. The SMA antenna interface is suitable for wireless communication devices with a frequency range from DC to 18 GHz, including RF modules, wireless routers, radios and the like. The SMA antenna interface has many advantages, the first of which is its small size. Since the SMA interface has a miniaturized design, it can be installed in a limited space and is suitable for devices of various sizes. Secondly, the SMA interface has the characteristics of high-frequency bandwidth. Due to its threaded connection design and precision manufacturing, the SMA interface can provide high-quality signal transmission and improve the stability and reliability of wireless communication. In addition, the SMA interface has the advantage of durability and easy installation, which can withstand long periods of use and frequent connections. Thanks to these advantages of SMA, the SMA antenna interface has a wide range of applications in the field of wireless communication, and is often used for antenna connection of RF modules, wireless routers and other devices.

In an embodiment of the present application, an external input device can be connected via the WIFI module and antenna interface 103, and the external input device comprises at least a wireless controller. Wherein, the wireless controller is configured to control the apparatus for implementing in-person teaching and online teaching, for collecting the first multimedia signal and outputting the second multimedia signal, and controlling the display interface layout of the display device.

In one example, the external input device comprises at least one of the following: a smartphone, a tablet computer, a PDA, a desktop computer, and a laptop computer. In other examples, the wireless controller may further comprise other electronic devices capable of connecting to the apparatus of the embodiments of the present application and sending instructions.

For example, if the wireless controller is a tablet computer, it is possible to establish a connection with the apparatus for implementing in-person teaching and online teaching through a WIFI module or an SMA antenna interface 103, and those skilled in the art will appreciate that the apparatus for implementing in-person teaching and online teaching in the present application has a corresponding software design, so as to facilitate the application of the apparatus for implementing in-person teaching and online teaching in the embodiment of the present application. The tablet computer should be installed with the said software design to facilitate the operation and control of the apparatus for implementing in-person teaching and online teaching. Functions such as controlling the display content of the head-up display, switching layouts, creating live streaming, joining live streaming, switching to teaching modes/discussion modes, operating cloud files (PPT, PDF, video, audio), PPT translation, writing on the whiteboard, setting interaction permissions for online students, and audio and video interaction between local teachers or students, can be realized through the said software design.

In an embodiment of the present application, in conjunction with FIGS. 1 & 2 the apparatus further comprises an expansion module 104 configured to connect to at least one of a USB splitter, a wired keyboard & mouse, a wireless keyboard & mouse, a laser pointer with remote control, an audio processor, a sound console, a sound card, and an audio mixer.

For example, four USB interfaces can be arranged in the expansion module 104, which can be used to access expansion devices such as keyboard, mouse, wireless keyboard & mouse, laser pointer with remote control, audio processor, sound console, sound card, audio mixer and the like, so as to meet the needs of different occasions.

Universal Serial Bus (USB) is a serial bus standard and a technical specification for input and output interfaces, which is widely used in information and communication products such as personal computers and mobile devices, and extended to other related fields such as photographic equipment, digital TV (set-top box), game consoles, etc.

In an embodiment of the present application, the apparatus further comprises a multi-function interface module 105 that supports at least one of the following protocols: a RS485 protocol, a CAN communication protocol, a UART protocol and a GPIO communication protocol.

In the embodiments of the present application, a first multimedia signal is processed by a processing control module to generate a second multimedia signal and send the processed second multimedia signal to a near-end and/or far-end display device, so that the in-person teaching and online teaching can be realized only with one apparatus for implementing in-person teaching and online teaching, which is of a high degree of overall integration. The apparatus of the embodiment of the present application can replace the multimedia devices used in the existing classrooms, without excessive operation of an instructor, but simply connecting to the instructor's computer or logging into the instructor's account to share his/her courseware.

Figure 3:
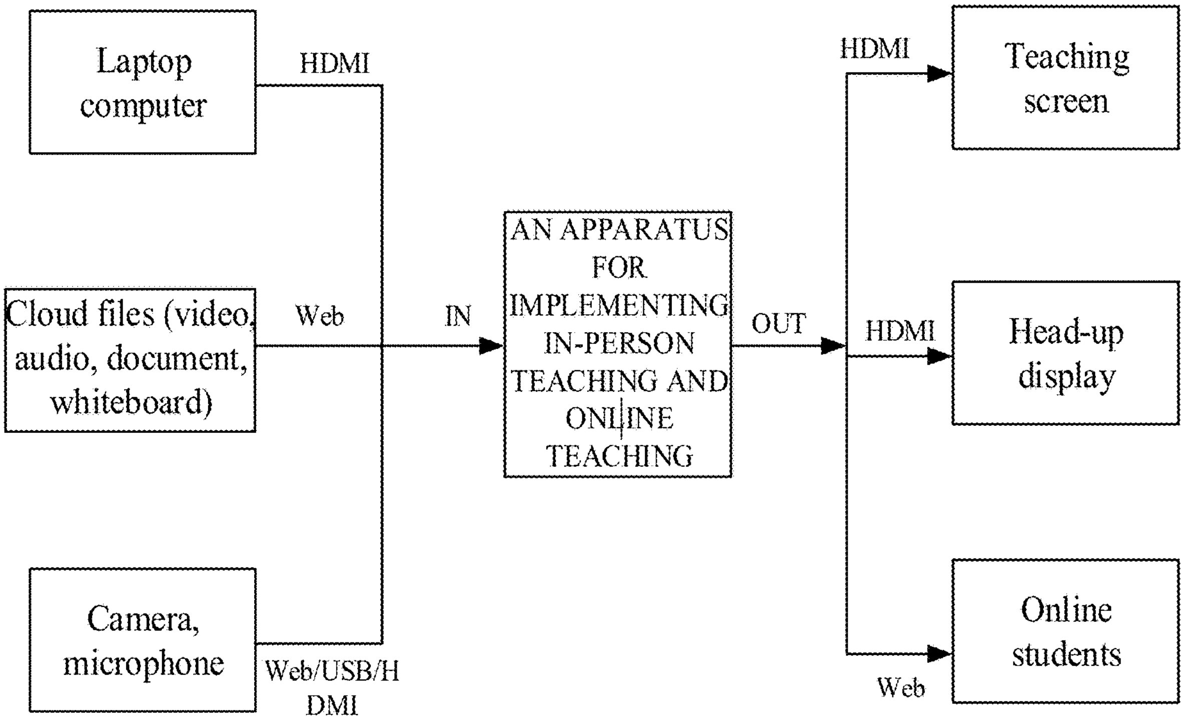
FIG. 3 illustrates a schematic diagram of an application scenario of an apparatus for implementing in-person teaching and online teaching according to an embodiment of the present application.

As shown in FIG. 3, this is a schematic diagram of an application scenario of an embodiment of the present application. In FIG. 3, the input terminal (IN) of the apparatus for implementing in-person teaching and online teaching is connected to a teacher's laptop computer through HDMI interface, and connected to a cloud server through network interface (such as RJ45) to obtain cloud files (such as video, audio, document, and whiteboard) and the audio and video of remotely attending students, and connected to an audio and video acquisition device such as a camera and a microphone through network interface. The output terminal (OUT) of the apparatus for implementing in-person teaching and online teaching is connected to the teaching screen and the head-up display through HDMI interface, and connected to the remote display device through network interface (such as RJ45) for online students to learn.

Although exemplary embodiments have been described herein with reference to the accompanying drawings, it is to be understood that the above-described exemplary embodiments are merely illustrative and are not intended to limit the scope of the present application. Numerous changes and modifications can be made therein by one of ordinary skill in the art without departing from the scope and spirit of the present application. All such changes and modifications are intended to be included within the scope of the present application as defined by the appended claims.

In the several embodiments provided herein, it should be understood that the disclosed apparatus and devices may be implemented in other ways. For example, the apparatus embodiments described above are only illustrative. For another example, the division of the units is only a logical function division, and there may be other divisions in actual implementation, for instance, a plurality of units or components may be combined or may be integrated into another system, or some features may be ignored or not implemented.

In the description provided herein, numerous specific details are set forth. However, it is understood that embodiments of the present application may be practiced without these specific details. In other instances, well-known apparatuses, structures and techniques have not been shown in detail in order not to obscure the understanding of this description.

Similarly, it should be appreciated that in the description of exemplary embodiments of the present application, various features of the utility model are sometimes grouped together in a single embodiment, figure, or description thereof for the purpose of streamlining the present application and aiding in the understanding of one or more of the various Utility Model aspects. This apparatus of disclosure, however, is not to be interpreted as reflecting an intention that the claimed application requires more features than are expressly recited in each claim. Rather, as the following claims reflect, inventive aspects lie in less than all features of a single disclosed embodiment that may be implemented to solve a corresponding technical problem. Thus, the claims following the detailed description are hereby expressly incorporated into this detailed description, with each claim standing on its own as a separate embodiment of this invention.

It will be understood by those skilled in the art that all of the features disclosed in this specification (including the accompanying claims, abstract and drawings), and all of the processes or elements of any apparatus or device so disclosed, may be combined in any combination, except combinations where some of such features are mutually exclusive. Each feature disclosed in this specification (including any accompanying claims, abstract and drawings) may be replaced by alternative features serving the same, equivalent or similar purpose, unless expressly stated otherwise.

Furthermore, while some embodiments described herein include some but not other features included in other embodiments, combinations of features of different embodiments are meant to be within the scope of the present application, and form different embodiments, as would be understood by those skilled in the art. For example, in the claims, any one of the claimed embodiments may be used in any combination.

It should be noted that the above-mentioned embodiments illustrate rather than limit the present application, and that those skilled in the art will be able to design alternative embodiments without departing from the scope of the appended claims. In the claims, any reference signs placed between parentheses shall not be construed as limiting the claim. The word "comprising" does not exclude the presence of elements or steps other than those listed in a claim. The word "a", "an" or "one" preceding an element does not exclude the presence of a plurality of such elements. The present application may be implemented by means of hardware comprising several distinct elements, and/or by means of a suitably programmed processor. In the unit claim enumerating several means, several of these means may be embodied by one and the same item of hardware. The terms "first", "second", "third" and the like are not necessarily used herein to connote a specific order, and may be interpreted as names.

What has been described above is merely preferred embodiments or a description of the embodiments of the present application, and is not intended to limit the scope of the present application. Any modifications and substitutions that could be easily made by a person skilled in the art within the scope of the technology disclosed herein, should be within the scope of the present application. The scope of protection of the present application shall be determined by the claims.

What is claimed:

1. An apparatus for implementing in-person teaching and online teaching, characterized in that the apparatus is a single integrated device integrally provided with multimedia circuitry comprising HDMI interfaces, a processor, and a wireless transceiver and an antenna interface within a single housing, wherein:

the antenna interface is a Sub Miniature Version A (SMA) antenna interface, and wherein the HDMI interfaces comprise a first unidirectional HDMI output interface, a second unidirectional HDMI output interface, a third unidirectional HDMI input interface, and a fourth unidirectional HDMI input interface;

the multimedia circuitry is configured to collect a first multimedia signal both on-site and from remote in real time and transmit the first multimedia signal to the processor, wherein the first multimedia signal both on-site and from remote at least comprises an instructor's courseware video signal, an instructor's lecturing image/video signal, an instructor's audio signal and an image/video signal of on-site students;

the wireless transceiver and the antenna interface are configured to connect via a wireless connection to a wireless controller for receiving an operation instruction transmitted from the wireless controller and sending the operation instruction to the processor, wherein the wireless controller is a handheld remote control device separate from the single integrated device;

the processor is configured to receive and process the first multimedia signal to generate a second multimedia signal comprising a combined display of the instructor's courseware video signal overlaid with the instructor's lecturing image/video signal, and send the processed second multimedia signal to the multimedia circuitry;

the multimedia circuitry further comprises at least one set of multimedia output interfaces, configured to connect to, and transmit the processed second multimedia signal received from the processor to, a multimedia display device arranged locally and/or remotely for display; and the wireless controller is configured to transmit operation instructions for controlling the processing of the first multimedia signal by the processor.

2. The apparatus of claim 1, characterized in that the multimedia circuitry comprises one set of multimedia input interfaces for inputting a local instructor's courseware video signal.

3. The apparatus of claim 1, characterized in that the multimedia circuitry comprises one set of network input interfaces configured to connect to a cloud server for uploading a recorded courseware to the cloud server for storage.

4. The apparatus of claim 1, characterized in that the multimedia circuitry comprises at least two sets of webcam interfaces for acquiring an instructor's lecturing image/video signal and an image/video signal of on-site students, respectively captured by local webcams.

5. The apparatus of claim 1, characterized in that the multimedia circuitry comprises two sets of multimedia output interfaces, wherein one set of multimedia output interfaces is configured to connect to a head-up display arranged locally, and an other set of multimedia output interfaces is configured to connect to a home screen arranged locally.

6. The apparatus of claim 1, characterized in that the multimedia circuitry further comprises a USB audio interface configured to receive and store an instructor's audio signal.

7. The apparatus of claim 6, characterized in that the multimedia circuitry further comprises an audio output module configured to output system and remote audio signals.

8. The apparatus of claim 1, characterized in that, further comprising USB ports configured to connect to at least one of a USB splitter, a wired keyboard & mouse, a wireless keyboard & mouse, a laser pointer with remote control, an audio processor, a sound console, a sound card, and an audio mixer.

9. The apparatus of claim 1, wherein the multimedia circuitry is configured to simultaneously collect the first multimedia signal from on-site sources and remote sources in real time.

10. The apparatus of claim 1, wherein the second multimedia signal displays the instructor's lecturing image/video signal in a picture-in-picture format overlaid on the instructor's courseware video signal.

11. The apparatus of claim 3, wherein the network input interfaces are configured to upload the recorded courseware including the second multimedia signal to the cloud server for remote online access.

12. The apparatus of claim 4, wherein the at least two sets of webcam interfaces are configured to connect to local webcams positioned to capture the instructor and on-site students from different viewing angles.

13. The apparatus of claim 5, wherein the head-up display is configured to display the second multimedia signal to the instructor during lecturing.

14. The apparatus of claim 5, wherein the home screen is configured to display the second multimedia signal to on-site students.

15. The apparatus of claim 6, wherein the USB audio interface is configured to store the instructor's audio signal in synchronization with the instructor's courseware video signal.

16. An apparatus for implementing in-person teaching and online teaching, characterized in that the apparatus is a single integrated device integrally provided with multimedia circuitry comprising HDMI interfaces, a processor, and a wireless transceiver and an antenna interface within a single housing, wherein:

the multimedia circuitry is configured to collect a first multimedia signal both on-site and from remote in real time and transmit the first multimedia signal to the processor, wherein the first multimedia signal both on-site and from remote at least comprises an instructor's courseware video signal, an instructor's lecturing image/video signal, an instructor's audio signal and an image/video signal of on-site students;

the wireless transceiver and the antenna interface are configured to connect via a wireless connection to a wireless controller for receiving an operation instruction transmitted from the wireless controller and sending the operation instruction to the processor, wherein the wireless controller is a handheld remote control device separate from the single integrated device;

the processor is configured to receive and process the first multimedia signal to generate a second multimedia signal comprising a combined display of the instructor's courseware video signal overlaid with the instructor's lecturing image/video signal, and send the processed second multimedia signal to the multimedia circuitry;

the multimedia circuitry further comprises at least one set of multimedia output interfaces, configured to connect to, and transmit the processed second multimedia signal received from the processor to, a multimedia display device arranged locally and/or remotely for display; and the apparatus further comprises serial communication ports that supports at least one of following protocols: a RS485 protocol, a CAN communication protocol, a UART protocol, and a GPIO communication protocol, wherein the serial communication ports are configured to support the processor in generating the combined display of the instructor's courseware video signal overlaid with the instructor's lecturing image/video signal for both in-person and online teaching.

17. The apparatus of claim 16, wherein the serial communication ports supports the RS485 protocol for serial communication with external devices.

18. The apparatus of claim 16, wherein the serial communication ports supports the CAN communication protocol for communication with external control devices.

19. An apparatus for implementing in-person teaching and online teaching, characterized in that the apparatus is a single integrated device integrally provided with multimedia circuitry comprising HDMI interfaces, a processor, and a wireless transceiver and an antenna interface within a single housing, wherein:

the multimedia circuitry is configured to collect a first multimedia signal both on-site and from remote in real time and transmit the first multimedia signal to the processor, wherein the first multimedia signal both on-site and from remote at least comprises an instructor's courseware video signal, an instructor's lecturing image/video signal, an instructor's audio signal and an image/video signal of on-site students;

the wireless transceiver and the antenna interface are configured to connect via a wireless connection to a wireless controller for receiving an operation instruction transmitted from the wireless controller and sending the operation instruction to the processor, wherein the wireless controller is a handheld remote control device separate from the single integrated device;

the processor is configured to receive and process the first multimedia signal to generate a second multimedia signal comprising a combined display of the instructor's courseware video signal overlaid with the instructor's lecturing image/video signal, and send the processed second multimedia signal to the multimedia circuitry;

the multimedia circuitry further comprises at least one set of multimedia output interfaces, configured to connect to, and transmit the processed second multimedia signal received from the processor to, a multimedia display device arranged locally and/or remotely for display; and wherein the multimedia circuitry, the processor, the wireless transceiver, and the antenna interface are all integrated on a single circuit board within the single housing, wherein the single circuit board is configured to support the processor in generating the combined display of the instructor's courseware video signal overlaid with the instructor's lecturing image/video signal for both in-person and online teaching.

* * * * *